US005799093A

United States Patent [19]

French et al.

[11] Patent Number: 5,799,093

[45] Date of Patent: Aug. 25, 1998

[54] PROCESS AND APPARATUS FOR REMOTE SYSTEM INSPECTION OF A VALUE DISPENSING MECHANISM SUCH AS A POSTAGE METER

[75] Inventors: Dale A. French, Clinton; Kathryn V. Lawton, Branford, both of Conn.

[73] Assignee: Pitney Bowes Inc., Stamford, Conn.

[21] Appl. No.: 701,947

[22] Filed: Aug. 23, 1996

[51] Int. Cl.[6] .......... H04L 9/00

[52] U.S. Cl. .......... 380/51; 380/24; 380/25

[58] Field of Search .......... 380/23, 25, 51

[56] References Cited

U.S. PATENT DOCUMENTS

| | | | |
|---|---|---|---|
| 4,376,299 | 3/1983 | Rivest | 364/900 |
| 4,907,271 | 3/1990 | Gilham | 380/25 |
| 5,077,660 | 12/1991 | Haines et al. | 364/464.02 |
| 5,237,506 | 8/1993 | Horbal et al. | 364/464.02 |
| 5,321,436 | 6/1994 | Herbert | 346/140 R |
| 5,377,268 | 12/1994 | Hunter | 380/23 |
| 5,383,115 | 1/1995 | Lecarpentier | 364/554 |
| 5,465,299 | 11/1995 | Matsumoto et al. | 380/23 |
| 5,490,077 | 2/1996 | Freytag | 364/464.02 |

*Primary Examiner*—Thomas H. Tarcza
*Assistant Examiner*—Carmen D. White
*Attorney, Agent, or Firm*—Steven J. Shapiro; Melvin J. Scolnick

[57] ABSTRACT

A remote inspection system including a value dispensing device including structure for printing an indication of value, structure for accounting for value dispensed, and structure for querying and receiving operational data from both the printing structure and the accounting structure and for creating a message based on the operational data which message has a first portion identifying the data and a second encrypted signature portion which is created based on at least some of the operational data; a data center remotely located from the value dispensing device; and structure for establishing communication between the data center and the value dispensing device permitting the value dispensing device to send the message to the data center; wherein the data center includes apparatus for extracting the operational data from the message, apparatus for extracting the at least some of the operational data from the message to create the second encrypted signature portion based on the at least some of the information thereby validating authenticity of the message, and a device for storing the operational data.

8 Claims, 2 Drawing Sheets

PROCESS AND APPARATUS FOR REMOTE SYSTEM INSPECTION OF A VALUE DISPENSING MECHANISM SUCH AS A POSTAGE METER

BACKGROUND OF THE INVENTION

The present invention relates to a method of obtaining inspection information from a remotely located system and, more particularly to providing a means for a central data station to obtain reliability, usage, and encryption security information from a remotely located secure system, wherein the communication between the central data station and the remote secure system is unsecured, such as via open telecommunication lines. A postage meter and like value dispensing devices are customarily referred to as secured devices. In the specific case of a postage meter, security is provided by two types of security, i.e., physical security and electronic security. Physical security refers to such things as providing the meter housing with tamper resistant and tamper detection devices. Electronic security is provided by electronically restricting access to critical electronic memory device memory locations and by causing the micro control system to execute certain critical data reconciliation techniques.

Verification of the integrity of meter security is customarily provided by periodic visual inspections of the meter and periodic account reconciliation between a meter's critical data representing transaction accounting records and transaction records which are maintained in a remotely located data center system. The reconciliation is performed each time the funds in the meter are recharged. Of particular interest, are those meters referred to as electronic postage meters having a conventional remote meter reset feature. Remote meter resetting addresses a process whereby the postage funds recharging of the meter is accomplished utilizing encrypted data transfer techniques over non-secure telecommunication lines. This process of remote meter resetting of funds may be carried out in an automatic mode utilizing an electronic modem to exchange encrypted data between the meter and the data center or by telephone exchange of encrypted data which is visually displayed by the meter to an operator who keys into the meter responsive data inputs.

As a result of the current status of postage meters, field inspection services must be maintained in order to carry out the visual inspection of each meter at the meter location. This service represents a substantial cost and a large investment in trained personnel. Additionally, a meter operational performance problem can result in transaction record errors which necessitate taking the postage meter out of service for corrective action. These types of errors occur without prior warning and, therefore, require prompt response from the field service organization. Conventionally, the meter is deactivated and physically removed from the user site for shipment to the manufacturers repair site and a substitute meter is installed at the customer site. Because of the lack of early warning relative to meter operational degradation and the customary practice of providing the user with a substitute meter so as not to negatively impact the user's activities, an extensive inventory of replacement or substitute meters must be maintained at a regional service site.

SUMMARY OF THE INVENTION

It is an object of the present invention to provide a process and method whereby a suitably equipped postage meter, and like apparatus, may be remotely inspected to determine the current operating characteristics of the postage meter.

It is a further object of the present invention to provide a process whereby operating data comprised of unsecured data and secured data representative of current and/or historical meter operating characteristics can be periodically remotely transmitted to a data center for analysis at the data center to verify proper operation of the meter and provide an early warning of a future potential meter operational failure.

The above objects are met by a remote inspection system including a value dispensing device including structure for printing an indication of value, structure for accounting for value dispensed, and structure for querying and receiving operational data from both the printing structure and the accounting structure and for creating a message based on the operational data which message has a first portion identifying the data and a second encrypted signature portion which is created based on at least some of the operational data; a data center remotely located from the value dispensing device; and structure for establishing communication between the data center and the value dispensing device permitting the value dispensing device to send the message to the data center; wherein the data center includes apparatus for extracting the operational data from the message, apparatus for extracting at least some of the operational data from the message to create the second encrypted signature portion based on at least some of the information thereby validating authenticity of the message, and a device for storing the operational data.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
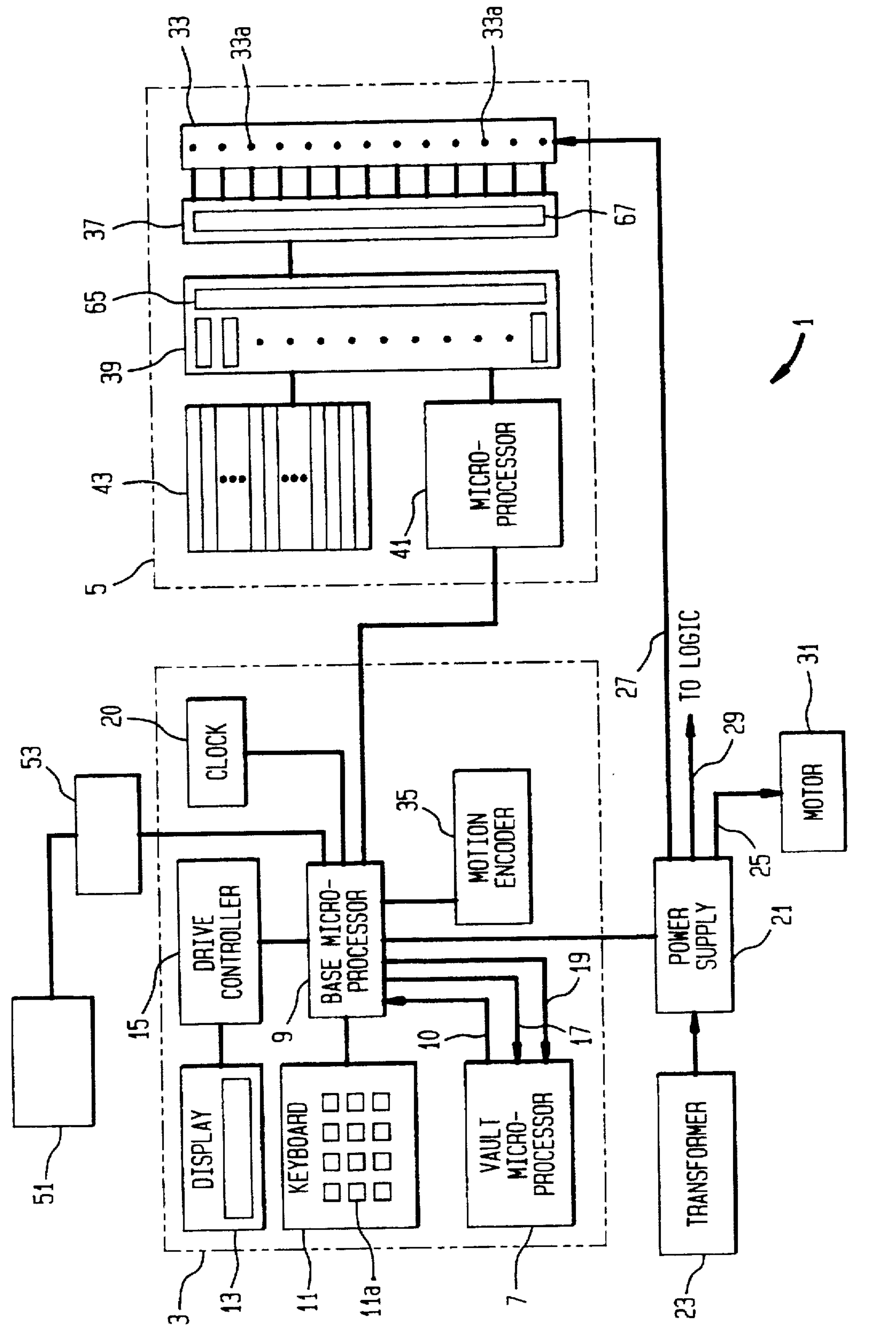
FIG. 1 is an electrical block diagram of the remote inspection system.

FIG. 1 shows a schematic representation of a postage meter 1 implementing the inventive process. Postage meter 1 includes two primary modules, a base module 3 and a printhead module 5. Base module 3 includes a vault microprocessor 7, which can be fixed within the base or be mounted on a card which is removable from the base and commonly referred to as a smartcard, and a transaction or base microprocessor 9. Vault microprocessor 7 has software and associated memory to perform the accounting functions of postage meter 1. That is, vault microprocessor 7 has the capability to have downloaded therein, either locally or remotely, in a conventional manner a predetermined amount of postage funds. During each postage transaction, vault microprocessor 7 checks to see if sufficient funds are available. If sufficient funds are available, vault microprocessor 7 debits the amount from a descending register, adds the amount to an ascending register, and sends the postage amount to the printhead module 5 via the transaction microprocessor 9. Transaction microprocessor 9 also sends the date data to the printhead module 5 so that a complete postal indicia image can be printed.

Vault microprocessor 7 thus manages the postage funds with the ascending register representing the lifetime amount of postage funds spent, the descending register representing the amount of funds currently available, and a control sum register showing the running total amount of funds which have been credited to vault microprocessor 7. Additional features of vault microprocessor 7 which can be included are a piece counter register, encryption algorithms for encoding the information sent to the printhead module 5, and software for requiring a user to input a personal identification number which must be verified by the vault microprocessor 7 prior to authorizing access to the vault features, such as postage debit, etc.

Transaction microprocessor 9 acts as a message coordinator in coordinating and assisting in the transfer of information along data line 10 between the vault microprocessor 7 and the printhead module 5, as well as coordinating various support functions necessary to complete the metering function. Transaction microprocessor 9 interacts with keyboard 11 to transfer user information input through keyboard keys 11*a* (such as PIN number, postage amount) to the vault microprocessor 7. Additionally, transaction microprocessor 9 sends data to a liquid crystal display 13 via a driver/controller 15 for the purpose of displaying user inputs or for prompting the user for additional inputs. Moreover, base microprocessor 9 provides power and a reset signal to vault microprocessor 7 via respective lines 17, 19. A clock 20 provides date and time information to transaction microprocessor 9. Alternatively, clock 20 can be eliminated and the clock function can be accomplished by the base microprocessor 9.

Postage meter 1 also includes a conventional power supply 21 which conditions raw A.C. voltages from a wall mounted transformer 23 to provide the required regulated and unregulated D.C. voltages for the postage meter 1. Voltages are output via lines 25, 27, and 29 to a printhead motor 31, printhead 33 and all logic circuits. Motor 31 is used to control the movement of the printhead relative to the mailpiece upon which an indicia is to be printed. Base microprocessor 9 controls the supply of power to motor 31 to ensure the proper starting and stopping of printhead 33 movement after vault microprocessor 7 authorizes a transaction.

Base module 3 also includes a motion encoder 35 that processes the movement of the printhead motor 31 so that the exact position of printhead 33 can be determined. Signals from motion encoder 35 are sent to printhead module 5 to coordinate the energizing of individual printhead elements 33*a* in printhead 33 with the positioning of printhead 33. Alternatively, motion encoder 35 can be eliminated and the pulses applied to stepper motor 31 can be counted to determine the location of printhead 33 and to coordinate energizing of printhead elements 33*a*.

Printhead module 5 includes printhead 33, a printhead driver 37, a drawing engine 39 (which can be a microprocessor or an Application Specific Integrated Circuit (ASIC)), a microprocessor 41 and a non-volatile memory 43. NVM 43 has stored therein image data of the fixed indicia and image data for each individual font that can be required as part of the variable data. Microprocessor 41 receives a print command, postage amount, and date via the transaction microprocessor 9. The postage amount and date are sent from microprocessor 41 to the drawing engine 39 which then accesses non-volatile memory 43 to obtain image data therefrom which is then downloaded by the drawing engine 39 to the printhead driver 37 in order to energize individual printhead elements 33*a* to produce a single column dot pattern of the indicia. The individual column-by-column generation of the indicia is synchronized with movement of printhead 33 until the full indicia is produced.

Printhead module microprocessor 41 has stored therein printhead module usage data, printhead module status data, and printhead module identification data. The printhead module usage data can, for example, be a counter of all of the indicia which have been printed by the meter to date. The printhead module status data can include information which is stored in the printhead module microprocessor 41 and which deals with identification of whether errors in communications have occurred within the printhead module 5 and/or errors whether have been identified as having occurred in the flash memory or the memory resident in the microprocessor 41 itself. The printhead module 5 identification data could, for example, be a printhead module model number or a printhead module software version number. Moreover, the printhead module status data could also include a counter which identifies how many times a mutual authentication handshake which is required to occur between printhead module microprocessor 41 and vault microprocessor 7 prior to every postage transaction has failed to properly occur.

Vault microprocessor 7, on the other hand, has various accounting data, vault identification data, and time dependent information stored therein. The accounting data could, for example, be the descending register value and the control sum value, while the meter identification data could be a particular vault identification number or, in the case where the vault microprocessor 7 is a removable smart card, a card software version number. The time differential information refered to above could, for example, be a date upon which the last remote inspection occurred or the date upon which stored keys used in generating postal indicia tokens were last updated.

Figure 2:
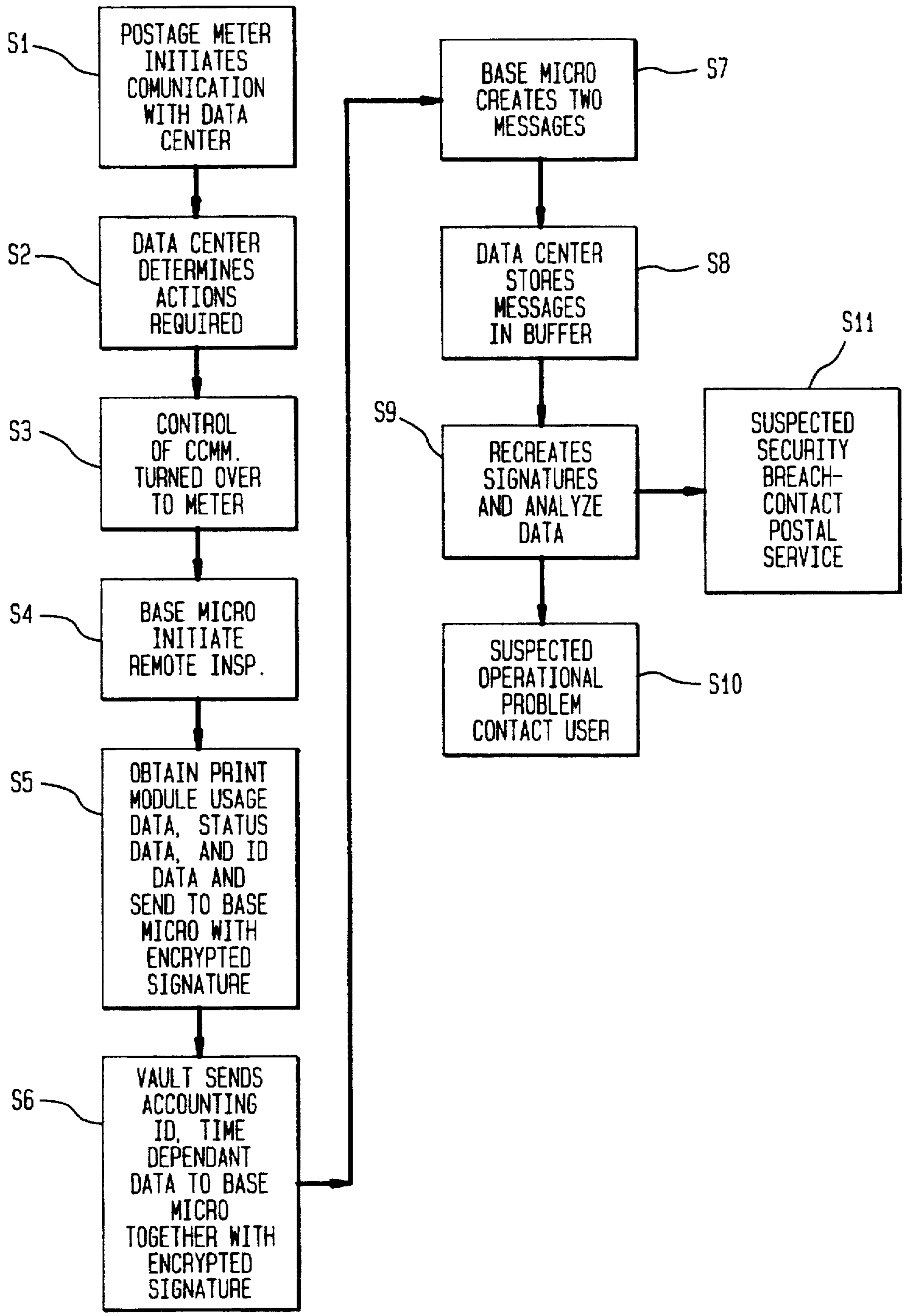
FIG. 2 is a flowchart of the remote inspection process.

Referring to FIG. 2, the inventive process for remote inspection of the postage meter is set forth. In step S1, the postage meter 1, initiates communication with a remote data center 51 via a modem 53 for any one of a number of reasons such as installing a brand new meter or recharging postage funds. Once this communication is established in a conventional manner, the data center 51, in step S2, checks its records to see if any outstanding actions are required on its part relative to the particular meter it is in communication with. Once the data center 51 has either determined that no actions are required on its part or has completed all outstanding actions, it will, in step S3, turn over control of the communication between the data center and the meter 1 to the postage meter 1. It is important to note that the vault microprocessor 7 has stored therein the date of the last remote inspection that was performed as well as first and second time periods. The base microprocessor 9 queries the vault microprocessor 7 each time a postage transaction is requested and obtains the date of the last remote inspection, calculates the time period between the last remote inspection date and the current date, and determines if the calculated time period is greater than the first and second stored time periods. If it is greater than the smaller first time period, a warning is given to the operator via display 13 to perform a zero dollar amount remote funds refill of the meter thereby encouraging the operator to initiate a communication with the data center 51. If, however, both the first and second time periods have been exceeded, the postage meter 1 will be disabled by the base microprocessor 9 until such time as the operator performs a zero dollar amount remote refill with the data center 51. Accordingly, a forced communication with the data center 51 is required if the time since the last remote inspection exceeds the second time period.

Once step S3 has been completed, base microprocessor 9 initiates the remote inspection process with the data center 51 prior to the initiation and execution of the action which caused the initial communication by the postage meter 1 with the data center 51 (step S4). Accordingly, the remote data inspection process will always be conducted upon any communication of the postage meter 1 with the data center 51.

In step S5, base microprocessor 9 obtains printhead module 5 usage data, printhead module status data, and printhead module identification data from the printhead module 5 together with an encrypted signature. The encrypted signature is created utilizing at least some of the previously identified data being sent from the printhead module 5 to the base microprocessor 41 together with a secure key which is stored in print module 5 and by applying an encryption algorithm to the data and the secure key. The encryption algorithm is stored in printhead module 5, as well. The printhead module data sent from the printhead module 5 to the base microprocessor 41 is sent in clear text although it could be encrypted. In step S6 the base microprocessor 9 obtains in clear text accounting data, vault identification data, and time dependent information together with an encrypted signature from the vault microprocessor 7. The encrypted signature is created from the data sent to the base microprocessor 9 from the vault microprocessor 7 and another secure key stored in the vault microprocessor 7 by applying an encryption algorithm thereto. It is readily apparent to one possessing ordinary skill in the art that the secure keys stored in the print module 5 and vault microprocessor 7 may be the same or different keys and the algorithms utilized by the printhead module 5 and vault microprocessor 7 may also be the same or different. Whatever the case may be, the data center 51 will have the same keys and algorithms stored therein for the purposes of recreating the signature as is discussed in more detail below. Alternatively, the data center 51 could decrypt the signature providing some pre-agreed result.

In step S7, the base microprocessor 9 takes all of the data provided by the printhead module 5 and vault microprocessor 7 together with the two encrypted signatures and creates two 64 byte messages which will include all of the data, the encryption signatures, and a check sum value for each of the data respectively sent from the printhead microprocessor 41 and vault microprocessor 7. The base microprocessor 9 combines these bits of information in any desired manner as long as the data center 51 has that same combination information available to it. Moreover, the combining of the bits of data can be changed over time or even randomized for each remote inspection activity to provide increased message security. Once again, as long as the data center 51 is in synch with the base microprocessor 9 regarding the combining process, the receipt and recreation of the signatures will be possible at the data center 51.

In step S8, the data center 51 receives the two 64 byte messages and stores them in a buffer. Subsequently, in step 59, on a periodic basis this data can be analyzed and the signatures validated by recreation at the data center 51. Subsequent analysis of this data can determine potential operational problems, and potential attempts at unauthorized access to the postage meter 1. Thus, the analysis of the data helps to identify existing or potential operational problems and also helps to identify if any tampering has been attempted on the meter. In the event that an operational problem is suspected, the user can be contacted (step 10). However, if a security problem is suspected the postal authority can be notified (step 11), as well.

An example of potential tampering could, for example, be derived from the data which identifies that there have been failed mutual authentication handshakes between the printhead module 5 and the vault microprocessor 7. This same data could also possibly be an indication of an impending operational failure. Moreover, the printhead module status data can also indicate an operational or pending operational problem.

Accordingly, the above described remote inspection process allows for both printhead module data and vault microprocessor data to be received in a secure manner by the data center 51 over a non-secure line. The security occurs because of the signatures attached to the two messages. If the data center 51 can recreate the signatures, it validates that the printhead module 5 and the vault microprocessor 7 are authorized devices. This provides a level of security as to the authenticity of the operational data being transmitted.

Moreover, the checksum values are used to determine if there was noise in the data line between the base microprocessor 9 and the data center 51. If the check sum values attached to the message are not validated by the data center 51, the impending postage transaction initiated by the user will not be permitted and the user will be advised to reestablish communication with the data center 51.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A remote inspection system comprising:

a value dispensing device including means for printing an indication of value, means for accounting for value dispensed, and means for querying and receiving operational data from both the printing means and the accounting means and for creating a message based on the operational data which message has a first portion identifying the data and a second encrypted signature portion which is created based on at least some of the operational data;

a data center remotely located from the value dispensing device; and means for establishing communication between the data center and the value dispensing device permitting the value dispensing device to send the message to the data center;

wherein the data center includes means for extracting the operational data from the message, means for extracting the at least some of the operational data from the message to create the second encrypted signature portion based on the at least some of the information thereby validating authenticity of the message, and means for storing the operational data.

2. A remote inspection system as recited in claim 1, wherein the message further includes a third encrypted signature portion which is created based on operational data received from the accounting means and the second encrypted signature portion is created based on operational data received from the printing means.

3. A remote inspection system as recited in claim 2, wherein operational data received from the accounting means includes accounting register information and operational data received from the printing means includes at least one of usage data, status data, and identification data for the printing means.

4. A remote inspection system as recited in claim 2, wherein the message is a bit stream of all operational data received from the accounting means and the printing means together with the first and second encrypted signature portions, the bit stream being combined in a preselected order that is known by the data center.

5. A remote inspection system as recited in claim 4, wherein the message further includes first and second check sum data respectively for the operational data received from the accounting means and the operational data received from the printing means.

6. A remote inspection system as recited in claim 3, wherein the operational data received from the printing means is the number of times a failed mutual authentication handshake has occurred between the printing means and the accounting means.

7. A method for inspecting a postage meter having an accounting vault, a print module which prints a postage indicia, and a base microprocessor in communication with the accounting vault and print module, the method comprising the steps of:

establishing communication between the postage meter and a data center;

sending first operational data related to the print module from the print module to the base microprocessor;

sending second operational data related to the accounting module from the accounting module to the base module;

generating a first encrypted signature based on the first operational data and a second encrypted signature based on the second operational data;

utilizing the base module to combine the first and second operational data and the first and second encrypted signatures in a predetermined manner as a bit stream message;

sending the bit stream message to the data center;

extracting the first and second operational data from the bit stream message; and verifying the authenticity of the first and second operational data by recreating the first and second encrypted signatures from the extracted operational first and second operational data; and storing the authenticated first and second operational data at the data center.

8. A method as recited in claim 7, further comprising the step of periodical ly changing the predetermined manner in which the first and second operational data and the first and second encrypted signatures are combined as the bit stream message.

* * * * *